US012597041B2

(12) United States Patent
Na et al.

(10) Patent No.: US 12,597,041 B2
(45) Date of Patent: Apr. 7, 2026

(54) ARTIFICIAL INTELLIGENCE(AI) MANAGEMENT SYSTEM USING BLOCKCHAIN, AI MANAGEMENT REGISTRATION METHOD AND AI MANAGEMENT USAGE METHOD

(71) Applicant: Foundation of Soongsil University-Industry Cooperation, Seoul (KR)

(72) Inventors: Hyeonsuk Na, Seoul (KR); Mingyu Jeon, Siheung-si (KR); Chiyeon Hwang, Bucheon-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 1036 days.

(21) Appl. No.: 17/715,529

(22) Filed: Apr. 7, 2022

(65) Prior Publication Data

US 2022/0230184 A1    Jul. 21, 2022

Related U.S. Application Data

(63) Continuation-in-part of application No. PCT/KR2020/004095, filed on Mar. 26, 2020.

(30) Foreign Application Priority Data

Oct. 16, 2019    (KR) ........................ 10-2019-0128216
Dec. 17, 2019    (KR) ........................ 10-2019-0169167

(51) Int. Cl.
*G06Q 30/018*        (2023.01)
*G06F 16/23*         (2019.01)
*H04L 65/403*        (2022.01)

(52) U.S. Cl.
CPC ....... *G06Q 30/018* (2013.01); *G06F 16/2365* (2019.01); *H04L 65/403* (2013.01)

(58) Field of Classification Search
CPC .......................... G06F 16/2365; H04L 65/403
See application file for complete search history.

(56) References Cited

U.S. PATENT DOCUMENTS

2012/0221502 A1* 8/2012 Jerram .................... G10L 13/00
                                                        706/46
2017/0214701 A1  7/2017 Hasan
2018/0012194 A1* 1/2018 Aoki ..................... H04L 65/403
                    (Continued)

FOREIGN PATENT DOCUMENTS

CN       109377367 A    2/2019
JP       2005-043970 A  2/2005
JP       2010-55624 A   3/2010
                    (Continued)

*Primary Examiner* — Barbara B Anyan
(74) *Attorney, Agent, or Firm* — Stein IP, LLC

(57) ABSTRACT

Provided is an artificial intelligence (AI) management system including at least one unit AI configured to perform a preset operation, manager AI configured to perform a complex operation based on the at least one unit AI, and a manager AI chain having at least one node device controlling an access of an external system to at least one piece of AI information of the at least one unit AI and the manager AI. The manager AI chain is configured to store the at least one piece of AI information of the at least one unit AI and the manager AI.

8 Claims, 12 Drawing Sheets

(56)         References Cited

U.S. PATENT DOCUMENTS

2020/0057758 A1*   2/2020   Choi ................... G06F 16/2365

FOREIGN PATENT DOCUMENTS

| | | | |
|---|---|---|---|
| JP | 2017-536247 | A | 12/2017 |
| KR | 10-1877828 | B1 | 8/2018 |
| KR | 10-2019-0015797 | A | 2/2019 |
| KR | 10-1983652 | B1 | 5/2019 |
| KR | 10-1986482 | B1 | 6/2019 |
| KR | 10-2002509 | B1 | 7/2019 |
| KR | 10-2011363 | B1 | 8/2019 |
| KR | 10-2019-0109300 | A | 9/2019 |
| KR | 10-2026580 | B1 | 9/2019 |

* cited by examiner

ARTIFICIAL INTELLIGENCE(AI) MANAGEMENT SYSTEM USING BLOCKCHAIN, AI MANAGEMENT REGISTRATION METHOD AND AI MANAGEMENT USAGE METHOD

CROSS-REFERENCE TO RELATED APPLICATION(S)

The present application is a continuation-in-part of international application No. PCT/KR2020/004095 filed on Mar. 26, 2020, and claims priority to Korean patent application Nos. 10-2019-0128216 filed on Oct. 16, 2019, and 10-2019-0169167 filed on Dec. 17, 2019, the entire contents of which are hereby incorporated by reference.

TECHNICAL FIELD

The present invention relates to an artificial intelligence (AI) management system, an AI management registration method, and an AI management use method employing a blockchain, and more particularly, to a system and method for registering and using unit AIs and a manager AI which are classified by operations that are performed in a blockchain-based manager AI chain.

BACKGROUND ART

In February 2017, the European Union (EU) plenary meeting passed the "Resolution on the legal status, development, and utilization of robots and AI," which urged the establishment of legal and ethical standards that robot makers and users should comply with and establishment of a new EU robotics authority to be in charge of tasks related to the standards. Also, the resolution recommends that the manufacturer comply with the three robot principles so that the robot does not pose a threat to humans and that the manufacturer install a "kill switch" for immediately stopping the robot's motion in case of an emergency.

This may be understood as emphasizing guidelines on the behavior of robot developers, producers, and users and a need for technical regulation on the robot algorithm in addition to legal and institutional regulations.

Meanwhile, in Korea, the "Basic robot act" was proposed in July 2017, which provides the principles of ethics that designers, manufacturers, and users of robots should comply with. The act includes regulations on the "robot registration system" that allows the Minister of Trade, Industry, and Energy to establish an information system for efficient management of registration information of robots.

In this regard, there is a need for a method of having hardware and software-based AI, which performs a specific task, certified according to strict verification and test standards of the government and preventing certification content and algorithm code related to the AI from being arbitrarily manipulated.

DISCLOSURE

Technical Problem

The present invention is directed to providing a system and method for registering and using unit artificial intelligences (AIs) and a manager AI, which are classified by operations that are performed in a blockchain-based manager AI chain.

Technical Solution

One aspect of the present invention provides an artificial intelligence (AI) management system including at least one unit AI configured to perform a preset operation, a manager AI configured to perform a complex operation based on the at least one unit AI, and a manager AI chain having at least one node device controlling an access of an external system to at least one piece of AI information of the at least one unit AI and the manager AI, wherein the manager AI chain is configured to store the at least one piece of AI information of the at least one unit AI and the manager AI.

When the at least one piece of AI information of the at least one unit AI and the manager AI is updated in the external system, the manager AI chain may change authentication information provided in the at least one piece of AI information of the at least one unit AI and the manager AI, which is previously stored, and modify the at least one piece of AI information of the at least one unit AI and the manager AI.

When a request for use of the at least one piece of AI information from the at least one unit AI and the manager AI is received from the external system, the manager AI chain may perform a proof test according to detailed AI information provided in the at least one piece of AI information of the at least one unit AI and the manager AI and generate proof information.

The proof information may include at least one piece of information among validity proof information, authentication proof information, detailed proof information, and use proof information.

The manager AI chain may store at least one piece of detailed AI information among authentication information, name information, detailed information, development information, test information, fee information, and use information of the at least one unit AI.

The manager AI chain may store at least one piece of detailed AI information among authentication information, additional authentication information, name information, detailed information, validity information, development information, test information, fee information, and use information of the manager AI.

The validity information may include the name information of the at least one unit AI used by the manager AI according to the complex operation performed in the manager AI.

Another aspect of the present invention provides a method of registering an AI management, which is a method of registering at least one piece of AI information of at least one unit AI, performing an arbitrary operation, and a manager AI, performing a complex operation based on the at least one unit AI, and a manager AI chain including at least one node device storing the at least one unit AI and the manager AI from an external system, the method including receiving a request for registration of the at least one piece of AI information of the at least one unit AI and the manager AI from the external system, generating detailed AI information of the at least one piece of AI information of the at least one unit AI and the manager AI, and storing the detailed AI information of the at least one piece of AI information of the at least one unit AI and the manager AI in the manager AI chain.

The method may further include receiving a request for update of the at least one piece of AI information of the at least one unit AI and the manager AI stored in the manager AI chain from the external system, changing authentication information provided in the at least one piece of AI information of the at least one unit AI and the manager AI stored in the manager AI chain, modifying the detailed AI information of the at least one piece of AI information of the at least one unit AI and the manager AI, and rechanging the authentication information about the at least one piece of AI information of the at least one unit AI and the manager AI modified in the modifying of the detailed AI information.

Another aspect of the present invention provides a method of using an AI management, which is a method of registering at least one piece of AI information of at least one unit AI performing an arbitrary operation, a manager AI performing a complex operation based on the at least one unit AI, and a manager AI chain including at least one node device storing the at least one unit AI and the manager AI from an external system, the method including receiving a request for use of the manager AI from the external system, generating proof information by performing a proof test according to detailed AI information provided in the manager AI, and permitting the external system to use the manager AI according to the proof information.

The generation of the proof information may further include generating validity proof information by comparing name information of the at least one unit AI used in the external system with validity information provided in the manager AI, generating authentication proof information according to authentication information provided in the manager AI, generating detailed proof information by comparing detailed information of AI information used in the external system with detailed information of the manager AI stored in the manager AI chain, and generating use proof information by comparing system name information of the external system with use information provided in the manager AI.

Advantageous Effects

According to the above-described aspect of the present invention, an artificial intelligence (AI) management system, AI management registration method, and AI management use method employing a blockchain are provided. Accordingly, it is possible to register unit AIs and a manager AI classified by operations that are performed in a blockchain-based manager AI chain.

MODES OF THE INVENTION

Figure 1:
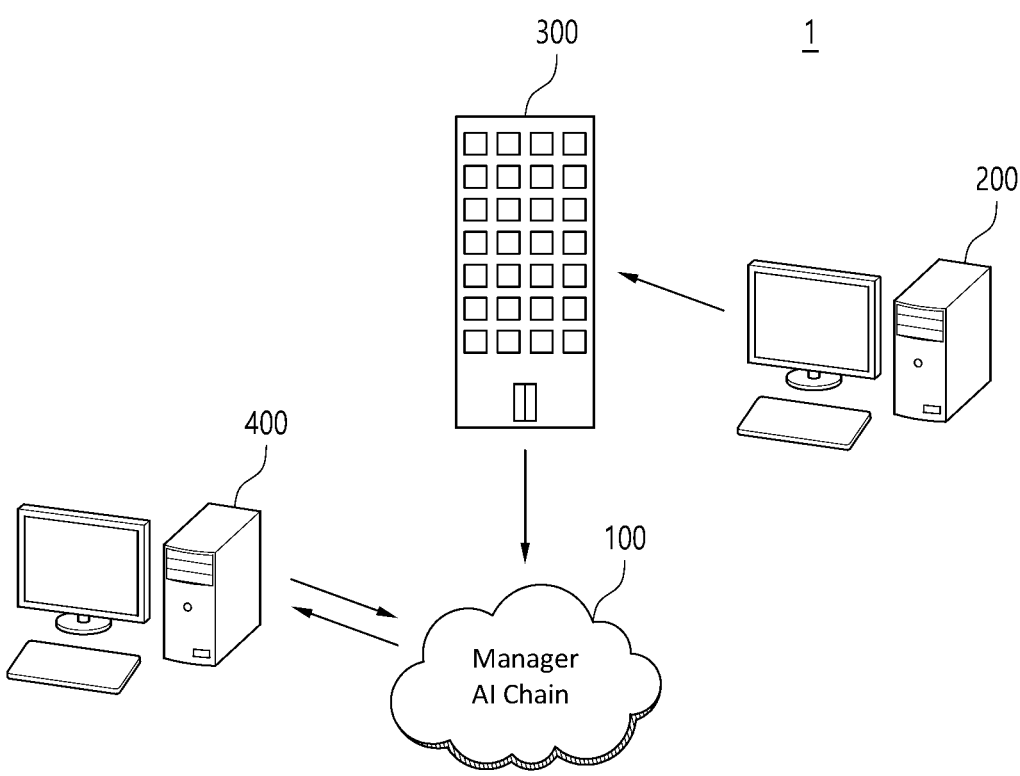
FIG. 1 is a schematic diagram of an artificial intelligence (AI) management system according to an embodiment of the present invention.

The following detailed description of the present invention refers to the accompanying drawings that illustrate specific embodiments for implementing the present invention. The embodiments are described in so detail that those of ordinary skill in the art can implement. It should be understood that embodiments may not be exclusively implemented though the embodiments differ from each other. For example, particular shapes, structures, and characteristics described herein in connection with one embodiment may be implemented in another embodiment without departing from the spirit and scope of the present invention. It is also to be understood that the positions or arrangement of individual components in each described embodiment may be changed without departing from the spirit and scope of the present invention. Therefore, the following detailed description is not to be taken in a limiting sense, and the scope of the present invention is to be limited only by the appended claims and by the full scopes of equivalents thereto when properly described. In the drawings, like reference numerals refer to like functions in several aspects.

Hereinafter, exemplary embodiments of the present invention will be described in detail with reference to the drawings.

FIG. 1 is a schematic diagram of an artificial intelligence (AI) management system according to an embodiment of the present invention.

An AI management system 1 may include a manager AI chain 100 and may be used by a developer 200, an administrator 300, and a user 400.

The manager AI chain 100 may be understood as a server device that stores any information on the basis of a blockchain network.

The blockchain network may be understood as being obtained by collecting information generated during a preset time period, generating one block from the information collected during the time period after the time period, and connecting the block in a chain form.

Here, the block connected in the chain form may be understood as being obtained by storing the newly generated block at the end of a previously generated block. The blockchain network may be understood as being obtained by transmitting the generated block to a node, which is each server connected to the blockchain network, to ensure the integrity of information and connecting the block to a previously generated chain when the block meets a condition set in the blockchain network.

Such a blockchain network may be easily implemented by those of ordinary skill in the art, and thus a detailed description thereof will be omitted. The manager AI chain

100 may be replaced with another type of blockchain network without departing from the spirit and scope of the present invention.

In this regard, when it is described in this specification that information is stored, modified, accessed, etc. by the manager AI chain 100, a new block may be generated through information generation, modification, access, etc. according to a blockchain network method applied to the manager AI chain 100 and connected to a blockchain through a verification process.

The manager AI chain 100 may store AI information of a unit AI, a manager AI, etc., and control command according to a request for registration, change, use, etc. of the AI information made by the administrator 300 and the user 400.

Here, the unit AI is AI information for performing a preset operation. To this end, the unit AI may include code information written to perform the corresponding operation.

Also, the manager AI may be AI information for performing a complex operation based on one or more unit AIs according to an operation performed by the unit AI. To this end, the manager AI may include one or more unit AIs.

Meanwhile, the developer 200 may mean an individual or company that writes at least one piece of AI information of the unit AI and manager AI.

The developer 200 may transmit newly written AI information or AI information partially changed by an update and the like to the administrator 300 to request authentication of the AI information.

The authentication of the AI information may mean a process of determining a probability that the AI information will be misused for an operation being performed, determining whether an operation according to a purpose for which the AI information is written is performed normally, or determining whether an essential operation required for the AI information may be performed according to legal regulations. Such authentication of AI information may be determined by the administrator 300.

Meanwhile, the administrator 300 may test at least one piece of AI information of a unit AI and manager AI written by the developer 200 to authenticate the AI information. The administrator 300 may mean a government institution or the like that registers or changes the authenticated AI information in the manager AI chain 100.

The user 400 may mean an individual, a company, a small business entity, etc. that uses at least one piece of AI information of a unit AI and a manager AI stored in the manager AI chain 100, and the user 400 may be understood as using AI information through a system that is present outside the AI management system 1. Accordingly, the name "external system" used in this specification may mean a user who uses AI information stored in the manager AI chain 100.

In this case, the user 400 may be permitted to use arbitrary AI information by the administrator 300 so as to use the AI information. Accordingly, AI information stored in the manager AI chain 100 may include information on the user 400 permitted to use the AI information, and when a request for use of the AI information is received from the user 400, information on the user 400 may be compared with the information on the permitted user 400 provided in the AI information to prove that the user 400 can use the AI information.

Meanwhile, the user 400 may mean a device including at least one element among a sensor unit, a communication unit, a power supply unit, a control unit, and an output unit according to the type of information demanded by AI information.

For example, when the user 400 is a device that searches for a path according to AI information, the user 400 may include a global positioning system (GPS) sensor for measuring the current location of the device, a communication unit capable of communicating with a satellite to precisely measure the location using the GPS sensor, a power supply unit for supplying power demanded by each element, a control unit for generating a path from the current location to a target location and selecting the shortest path, and an output unit for outputting the selected shortest path on a display or the like.

Figure 2:
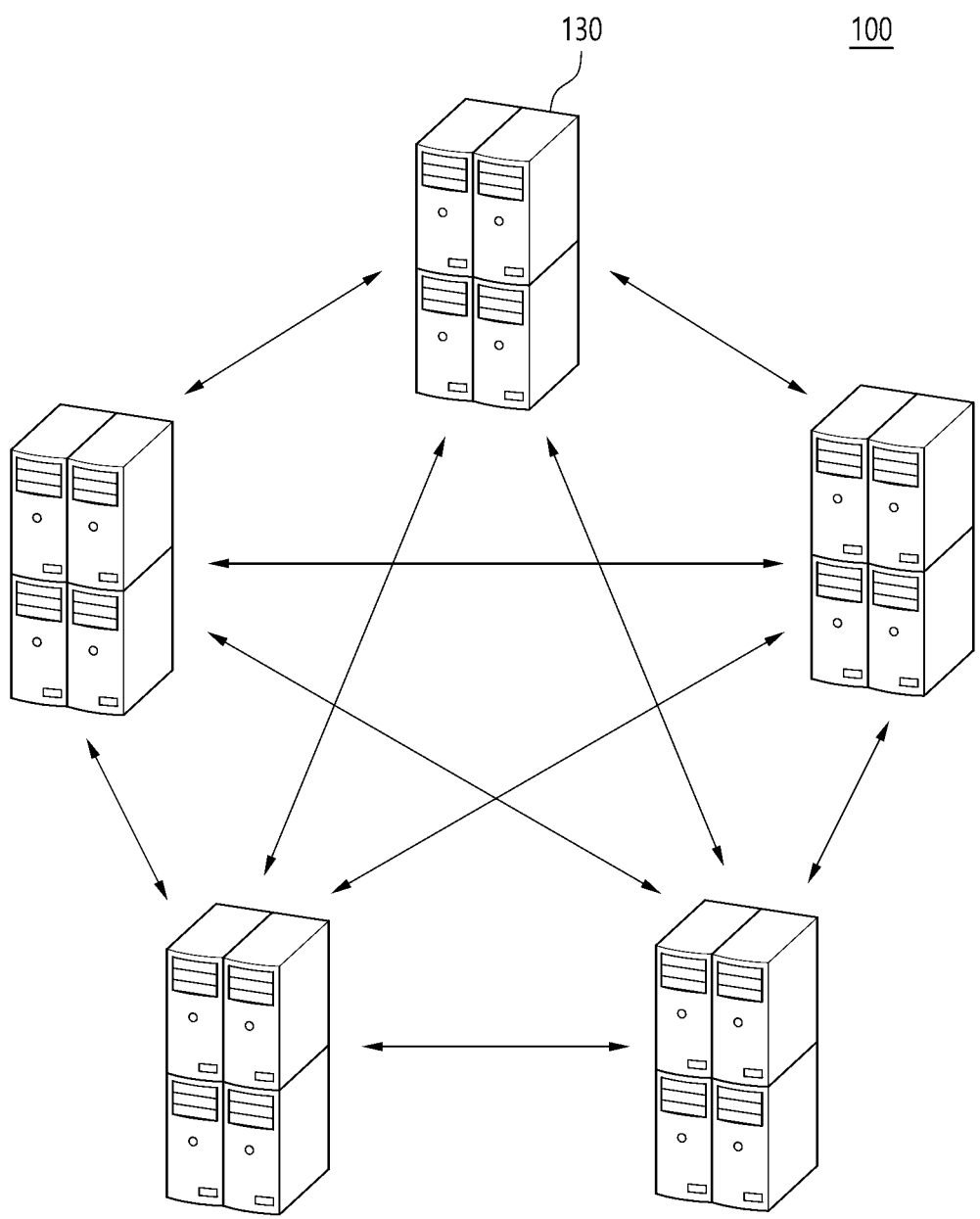
FIG. 2 is a schematic diagram illustrating a manager AI chain of FIG. 1.
Figure 3:
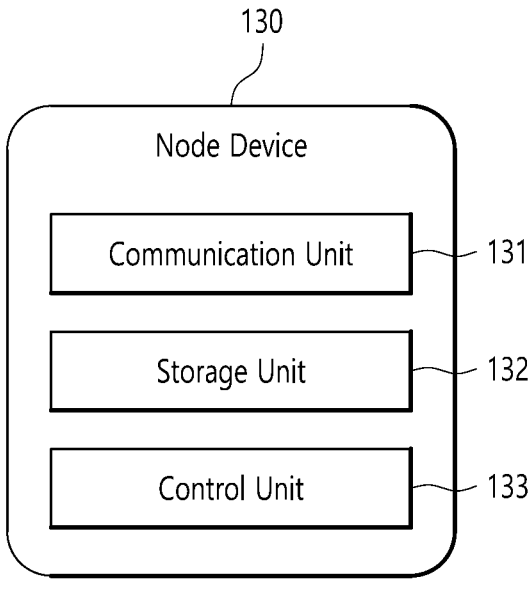
FIG. 3 is a control block diagram of a node device of FIG. 2.

FIG. 2 is a schematic diagram illustrating a manager AI chain of FIG. 1, and FIG. 3 is a control block diagram of a node device of FIG. 2.

Referring to FIG. 2, the manager AI chain 100 may include one or more node devices 130, each of which may include a communication unit 131, a storage unit 132, and a control unit 133, as shown in FIG. 3.

Accordingly, the manager AI chain 100 may be understood as a blockchain network including the one or more node devices 130, and thus a block generated by each of the node device 130 and registered in the blockchain network may include at least one piece of AI information of a unit AI and a manager AI.

The one or more node devices 130 may operate as at least one of a full node and a light node. In this case, a full node may be understood as a node device 130 in which information on all blocks generated by the node devices 130 is stored, and a light node may be understood as a node device 130 that receives some blocks stored in a full node.

Meanwhile, any one of the one or more node devices 130 may be selected as a representative node according to a vote by the one or more node devices 130 included in the manager AI chain. The node device 130 selected as the representative node may vary depending on a time period or an information processing period.

In this case, the representative node may generate a block according to information received from a node device 130 and transmit the generated block to the node device 130 so that the block may be connected to a chain of blocks stored in the node devices 130.

The communication unit 131 may receive at least one of a registration request and an update request from the administrator 300. In this case, the communication unit 131 may additionally receive detailed AI information provided in at least one piece of AI information of a unit AI and a manager AI registered or updated in the manager AI chain 100 from the administrator 300.

Meanwhile, the communication unit 131 may receive a use request from the user 400. In this case, the communication unit 131 may additionally receive detailed AI information of AI information to be used by the user 400 from the user 400.

When the registration request is received from the communication unit 131, the storage unit 132 may store the detailed AI information received from the administrator 300.

Also, when the update request is received from the communication unit 131, the storage unit 132 may modify detailed AI information of previously stored AI information according to the detailed AI information received from the administrator 300.

In this regard, the storage unit 132 may generate a transaction for changing detailed AI information in the blockchain network. Accordingly, the manager AI chain 100 may determine that detailed AI information has been updated in the blockchain network.

When the update request is received from the administrator 300, the control unit 133 may change information, which represents authentication by the administrator 300, in the corresponding AI information stored in the storage unit 132. Accordingly, the storage unit 132 may update the AI information.

When the use request is received from the user 400, the control unit 133 may verify AI information received from the user 400 by comparing the detailed AI information of the AI information received from the user 400 with detailed AI information of the corresponding AI information stored in the manager AI chain 100 and generate verification information.

Accordingly, the communication unit 131 may transmit the verification information generated by the control unit 133 to the user 400.

Figure 4:
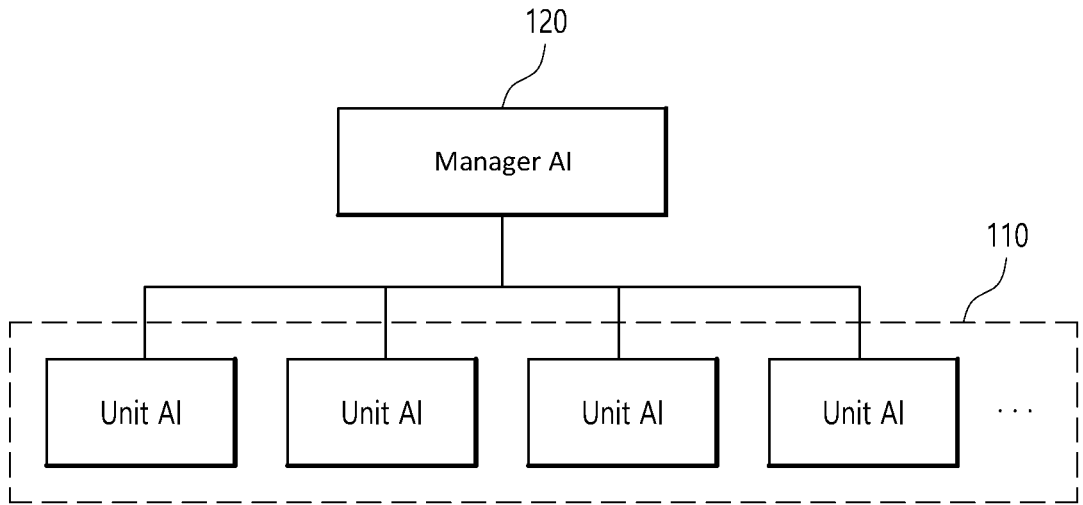
FIG. 4 is a schematic diagram illustrating the relationship between unit AIs and a manager AI in an AI management system according to an embodiment of the present invention.

FIG. 4 is a schematic diagram illustrating the relationship between unit AIs and a manager AI in an AI management system according to an embodiment of the present invention.

Unit AIs 110 are AI information that performs a preset operation. To this end, the unit AIs 110 may include code information that is written to perform the operation. Also, the unit AIs 110 may additionally include detailed AI information for distinguishing the unit AIs 110 from each other and representing each of the unit AIs 110.

In this regard, the unit AIs 110 may mean software and the like that perform a simple operation showing a relatively low degree of difficulty in implementation.

For example, the unit AIs 110 may mean AI information that performs operations such as optical character recognition (OCR), biometric recognition, pathfinding, etc.

The manager AI 120 may be AI information that performs a complex operation based on at least one unit AI 110 according to an operation performed by a unit AI 110. To this end, the manager AI 120 may include one or more unit AIs 110.

To this end, the manager AI 120 may additionally include code information that represents an operation performed by a unit AI 110 included in an arbitrary manager AI 120. Also, the manager AI 120 may additionally include detailed AI information about unit AIs 110 included therein and detailed AI information for distinguishing different manager AIs 120 from each other.

In this regard, the manager AI 120 may mean software and the like that performs, in a combined manner, several operations showing a relatively high degree of difficulty in implementation.

For example, the manager AI 120 may mean AI information that performs operations such as police duties, firefighting duties, autonomous driving, etc.

AI information that performs police duties may mean AI information that is implemented to perform an operation of recognizing a criminal, search for a patrol route in an arbitrary area, and to perform walking or vehicle movement in a combined manner.

Figure 5:
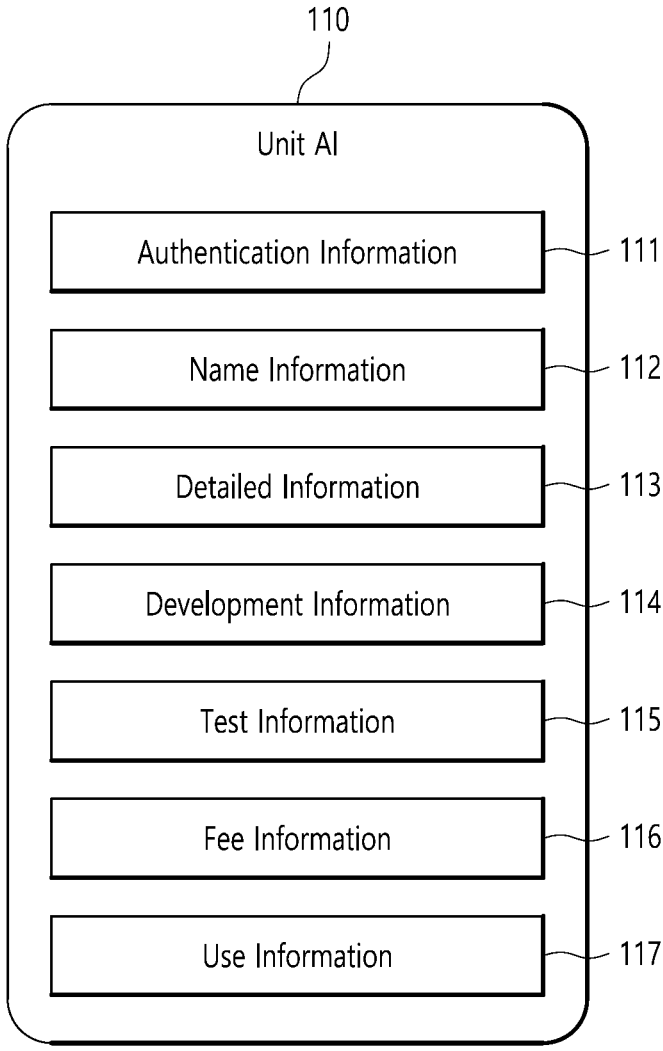
FIG. 5 is a block diagram of a unit AI stored in the manager AI chain of FIG. 1 according to an embodiment of the present invention.

FIG. 5 is a block diagram of a unit AI stored in the manager AI chain of FIG. 1.

The unit AI 110 may include authentication information 111, name information 112, detailed information 113, development information 114, test information 115, fee information 116, and use information 117. Accordingly, information included in AI information may be understood as detailed AI information.

In other words, detailed AI information provided in the unit AI 110 may include at least one of the authentication information 111, the name information 112, the detailed information 113, the development information 114, the test information 115, the fee information 116, and the use information 117.

Accordingly, the manager AI chain 100 may store detailed AI information including at least one of the authentication information 111, the name information 112, the detailed information 113, the development information 114, the test information 115, the fee information 116, and the use information 117 regarding the unit AI 110.

Meanwhile, as the detailed AI information, the result of each entry may be input by the administrator 300 or the developer 200. In this case, each entry of the detailed AI information may be input in a preset form.

In this regard, the authentication information 111 may be information representing that the AI information has been authenticated by the administrator 300. Accordingly, the authentication information 111 may represent at least one of a state of being authenticated by the administrator 300 and a state of not being authenticated by the administrator 300.

For example, when the AI information has been authenticated by the administrator 300, the authentication information 111 may represent True, and when the AI information has not been authenticated by the administrator 300, the authentication information 111 may output False.

The name information 112 may be information that is set for distinguishing different pieces of AI information from each other. Accordingly, the name information may be differently set for different pieces of AI information.

In this regard, the name information 112 may be set for a plurality of pieces of AI information having at least one piece of different other detailed AI information so that the pieces of AI information may represent different pieces of name information 112.

Also, the name information 112 may be set to represent a location where the AI information is stored in the blockchain network. This may mean that the address of AI information is used as the name information 112 in the blockchain network.

Further, the name information 112 may additionally include a classification code for classifying different pieces of name information 112 according to the purpose of an operation performed by the AI information.

The detailed information 113 may be information including a version of AI information, a detailed description, and code information.

The version of AI information may be understood as being obtained by changing the version of arbitrary AI information when an update is performed due to a partial information change in the AI information.

Also, the detailed information may be information representing an operation performed by arbitrary AI information, and the code information may mean programming code and the like written by the developer 200 so that arbitrary AI information may perform a specific operation.

The development information 114 may mean the developer 200 who has written the code information of AI information, and the developer 200 may include a company or individual who writes the code information to perform an operation of AI information.

The test information 115 may mean the administrator 300 who authenticates AI information. In this case, the test information 115 may be set in a coded form in which numerals or characters are arranged to represent the administrator 300.

The fee information 116 may mean the amount of money that is set for the user 400 to use AI information stored in the manager AI chain 100.

The use information 117 may include information representing the user 400 who has been permitted by the administrator 300 to use AI information stored in the manager AI chain 100.

The information representing the permitted user 400 may be set in the form of numerals or characters arranged so that different users 400 can be distinguished from each other. To this end, the manager AI chain 100 may collect unique information of each user 400.

The information representing the user 400 may mean an address of the user 400 registered in the blockchain network. In this case, the use information 117 may be set in a form that designates a permitted state in the address of the user 400.

For example, the use information 117 may designate True for a blockchain network address of the permitted user 400 to represent that the user 400 is permitted for the corresponding AI information.

Meanwhile, the unit AI 110 may mean software executed on a device, including at least one element among a sensor unit, a communication unit, a power supply unit, a control unit, and an output unit. The unit AI 110 may mean a device including software and hardware, such as a sensor unit, a communication unit, a power supply unit, a control unit, an output unit, etc., that performs an operation based on the software.

In this regard, a specific shape, structure, and characteristic of an embodiment described herein may be implemented in another embodiment without departing from the spirit and scope of the present invention. Also, it is to be understood that the position or placement of each individual component in each disclosed embodiment may be changed without departing from the spirit and scope of the present invention.

Figure 6:
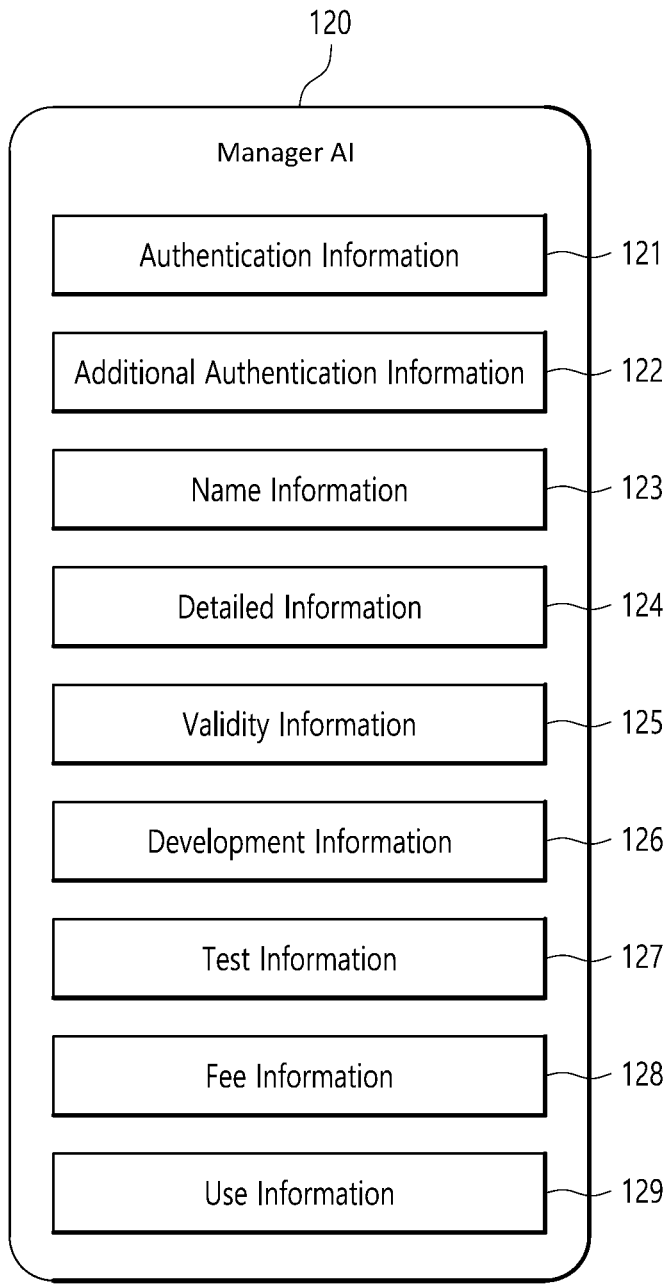
FIG. 6 is a block diagram of a manager AI stored in the manager AI chain of FIG. 1.

FIG. 6 is a block diagram of a manager AI stored in the manager AI chain of FIG. 1.

The manager AI 120 may additionally include authentication information 121, additional authentication information 122, name information 123, detailed information 124, validity information 125, development information 126, test information 127, fee information 128, and use information 129.

In this regard, it may be understood that detailed AI information provided in the manager AI 120 may include at least one of the authentication information 121, the additional authentication information 122, the name information 123, the detailed information 124, the validity information 125, the development information 126, the test information 127, the fee information 128, and the use information 129.

Accordingly, with regard to the manager AI 120, the manager AI chain 100 may store detailed AI information including at least one of the authentication information 121, the additional authentication information 122, the name information 123, the detailed information 124, the validity information 125, the development information 126, the test information 127, the fee information 128, and the use information 129.

As the detailed AI information, the result of each entry may be input by the administrator 300 or the developer 200. In this case, each entry of the detailed AI information may be input in a preset form.

In this regard, the authentication information 121 may be information representing that AI information has been authenticated by the administrator 300. Accordingly, the authentication information 121 may represent at least one of a state of being authenticated by the administrator 300 and a state of not being authenticated by the administrator 300.

For example, when the AI information has been authenticated by the administrator 300, the authentication information 121 may represent True, and when the AI information has not been authenticated by the administrator 300, the authentication information 121 may output False.

The additional authentication information 122 may be information generated to distinguish particular AI information. The particular AI information is AI information for performing an operation related to a disaster, a war, a crime, etc., and may be set by the administrator 300.

Also, the additional authentication information 122 may mean information that is set so that the user 400 is additionally authenticated by the administrator 300 every time the user 400 uses AI information. To this end, the additional authentication information 122 may be set to True for AI information demanding additional authentication.

The name information 123 may be information that is set to distinguish different pieces of AI information. Accordingly, the name information 123 may be differently set for pieces of AI information.

In this regard, the name information 123 may be set for a plurality of pieces of AI information having at least one piece of different other detailed AI information so that the pieces of AI information may represent different pieces of name information 123.

Also, the name information 123 may be set to indicate a location where AI information is stored in the blockchain network. This may mean that the address of AI information is used as the name information 112 in the blockchain network.

Further, the name information 123 may additionally include a classification code for classifying different pieces of name information 123 according to the purpose of an operation performed by AI information.

The detailed information 124 may be information including a version of AI information, a detailed description, and code information.

The version of AI information may be understood as being obtained by changing the version of arbitrary AI information when an update is performed due to a partial information change in the AI information.

Also, the detailed information may be information representing an operation performed by arbitrary AI information, and the code information may mean programming code and the like written by the developer 200 so that arbitrary AI information may perform a specific operation.

The validity information 125 may include name information 112 of at least one unit AI 110 used by the manager AI 120 according to a complex operation performed by the manager AI 120. Accordingly, the validity information 125 may be information that arranges the name information 112 of the at least one unit AI 110 included in the manager AI 120.

The development information 126 may mean the developer 200 who has written the code information of the AI information. The developer 200 may include a company or individual who writes the code information to perform an operation of the AI information.

The test information 127 may mean the administrator 300 who authenticates AI information. In this case, the test information 127 may be set in a coded form in which numerals or characters are arranged to represent the administrator 300.

The fee information 128 may mean the amount of money that is set for the user 400 to use AI information stored in the manager AI chain 100.

The use information 129 may include information representing the user 400 who has been permitted by the administrator 300 to use AI information stored in the manager AI chain 100.

The information representing the permitted user 400 may be set in the form of numerals or characters arranged so that different users 400 can be distinguished from each other. To this end, the manager AI chain 100 may collect unique information of each user 400.

The information representing the user 400 may mean an address of the user 400 registered in the blockchain network. In this case, the use information 129 may be set in a form that designates a permitted state in the address of the user 400.

For example, the use information 129 may designate True for a blockchain network address of the permitted user 400 to represent that the user 400 is permitted for the corresponding AI information.

Meanwhile, the use information 129 of the manager AI 120 may be added to the use information 117 provided in the at least one unit AI 110 included in the manager AI 120.

Meanwhile, the manager AI 120 may mean software executed on a device including at least one element among a sensor unit, a communication unit, a power supply unit, a control unit, and an output unit according to the at least one unit AI 110 included in the manager AI 120. The manager AI 120 may mean a device including software and hardware, such as a sensor unit, a communication unit, a power supply unit, a control unit, an output unit, etc., that performs an operation based on the software.

In this regard, a specific shape, structure, and characteristic of an embodiment described herein may be implemented in another embodiment without departing from the spirit and scope of the present invention. Also, it is to be understood that the position or placement of each individual component in each disclosed embodiment may be changed without departing from the spirit and scope of the present invention.

Figure 7:
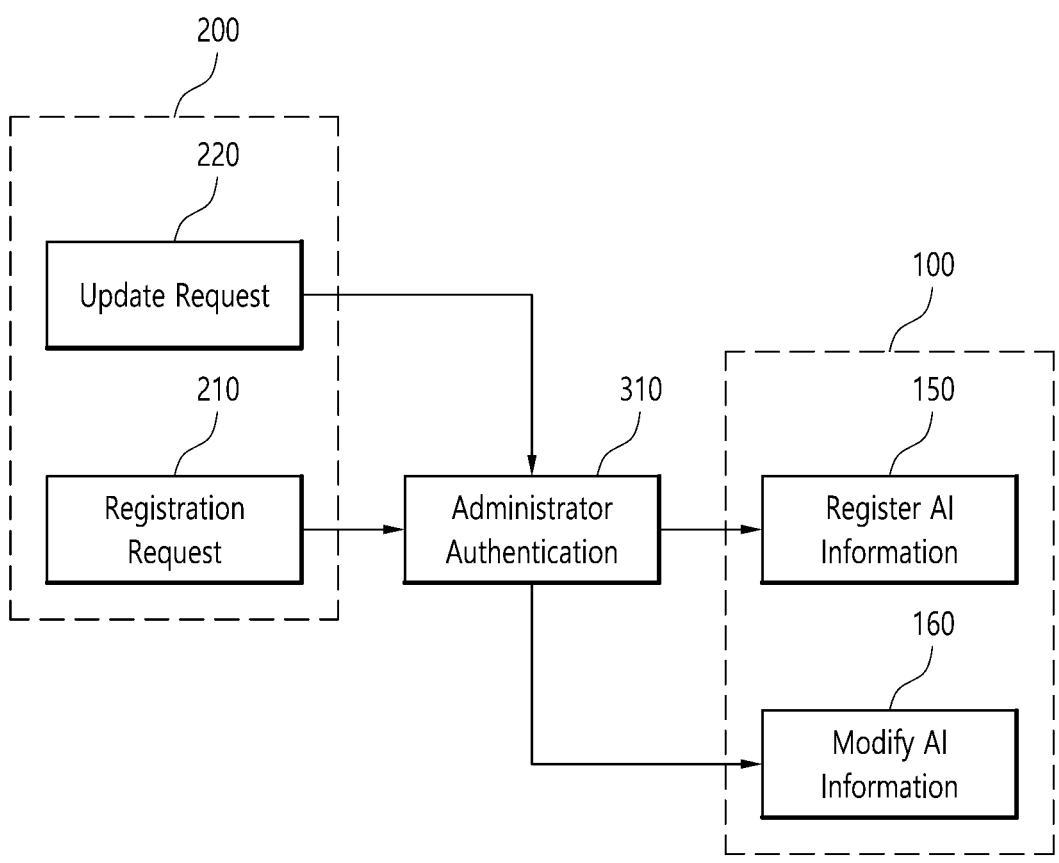
FIG. 7 is a schematic diagram illustrating a process of registering and modifying AI information in the manager AI chain of FIG. 1.

FIG. 7 is a schematic diagram illustrating a process of registering and modifying AI information in the manager AI chain of FIG. 1.

Referring to FIG. 7, the developer 200 may transmit a registration request 210 for AI information to the administrator 300.

The registration request 210 may be understood as requesting authentication of the administrator 300 so that at least one piece of AI information from the unit AI 110 and the manager AI 120 written by the developer 200 may be stored in the manager AI chain 100 and used by the user 400.

Accordingly, the administrator 300 may receive information on at least one piece of AI information from the unit AI 110 and the manager AI 120 from the developer 200, and the administrator 300 may perform administrator authentication 310 for the received AI information according to a preset test such as a misuse probability test, an operational performance assessment, a mandatory regulation compliance test, etc.

When the AI information received from the developer 200 passes the administrator authentication 310, the administrator 300 may generate detailed AI information from the AI information and register 150 the AI information and the detailed AI information in the manager AI chain 100.

Accordingly, the manager AI chain 100 may store the AI information. This may be understood as generating an address at which the AI information is stored in the manager AI chain 100 which is formed as a blockchain network.

Accordingly, the user 400, the administrator 300, and the developer 200 can easily access any AI information.

Also, referring to FIG. 7, the developer 200 may transmit an update request 220 for AI information stored in the manager AI chain 100 to the administrator 300.

The update request 220 may be understood as requesting authentication of the administrator 300 when the developer 200 changes some of AI information stored in the manager AI chain 100 so that the changed information may apply to the AI information stored in the manager AI chain 100.

Accordingly, the administrator 300 may receive information on at least one piece of AI information from the unit AI 110 and the manager AI 120. The information received by the administrator 300 may include changed information for the AI information stored in the manager AI chain 100.

Accordingly, the administrator 300 may change the pieces of authentication information 111 and 121 of AI information previously stored in the manager AI chain 100 to represent an unauthenticated state.

Also, the administrator 300 may perform administrator authentication 310 again for the received AI information according to a preset test such as a misuse probability test, an operational performance assessment, a mandatory regulation compliance test, etc.

When the update for the AI information received from the developer 200 passes the administrator authentication 310, the administrator 300 may modify 160 detailed AI information of the AI information previously stored in the manager AI chain 100.

Meanwhile, modifying the detailed AI information may be understood as registering changed content for the previously stored detailed AI information through the manager AI chain 100 in the blockchain network and transmitting the changed content to another node registered in the manager AI chain 100.

Figure 8:
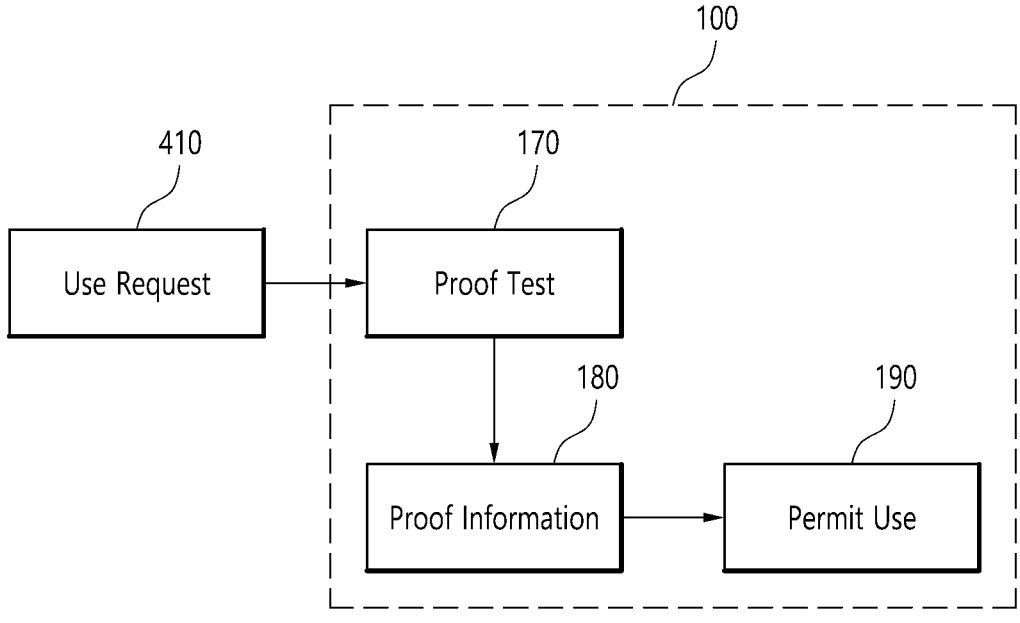
FIG. 8 is a schematic diagram illustrating a process in which a user of FIG. 1 uses AI information stored in the manager AI chain.

FIG. 8 is a schematic diagram illustrating a process in which a user of FIG. 1 uses AI information stored in the manager AI chain.

Referring to FIG. 8, the user 400 may transmit a use request 410 for AI information to the manager AI chain 100.

The use request 410 may be understood as transmitting AI information used by the user 400 and information representing the user 400 to the manager AI chain 100 so that the user 400 can use the AI information stored in the manager AI chain 100.

The AI information used by the user 400 may be understood as AI information installed on an external system represented by the user 400.

For example, the user 400 may transmit the use request 410 for AI information using a blockchain network address of the AI information stored in the manager AI chain 100. In this case, the user 400 may transmit detailed AI information of the AI information installed on the external system thereof and an address of the user 400 of the blockchain network to the manager AI chain 100 so that the manager AI chain 100 can perform a proof test 170.

Meanwhile, the manager AI chain 100 may perform the proof test 170 according to detailed AI information provided in at least one piece of AI information from the unit AI 110 and the manager AI 120 and generate proof information 180.

In this case, the proof test 170 may be understood as comparing the information representing the user 400 with detailed AI information provided in AI information designated by the user 400 to generate the proof information 180, which may include at least one of validity proof information, authentication proof information, detailed proof information, and use proof information.

The name information 112 of the unit AI 110 used in the external system of the user 400 is compared with the validity information 125 of the manager AI 120 stored in the manager AI chain 100. When the name information 112 of the unit AI 110 used in the external system is found in the validity information 125 of the manager AI 120, the validity proof information may be set to a state representing that the validity has been proved.

The authentication proof information may be set to a state representing that the authentication has been proved when the authentication information 121 of the manager AI 120 stored in the manager AI chain 100 is set to a state representing that the authentication information 121 has been authenticated by the administrator 300.

The detailed information 113 and 124 of AI information used in the external system is compared with the detailed information 124 of the manager AI 120 stored in the manager AI chain 100. When the detailed information 113 and 124 of AI information used in the external system is identical to the detailed information 124 of the manager AI 120, the detailed proof information may be set to a state representing that proof of the detailed information has been completed.

The information representing the user 400 who has requested the use request 410 is compared with the use information 117 and 129 of AI information stored in the manager AI chain 100. When the information representing the user 400 is set to a state representing that the information representing the user 400 has been approved in the use information 117 and 129, the use proof information may be set to a state representing that the use information has been proved.

When the validity proof information, the authentication proof information, the detailed proof information, and the use proof information are set to a state representing that the validity, the authentication, the detailed information, and the use information have been proved according to the proof test, the manager AI chain 100 may permit 190 the user 400 to access AI information stored in the manager AI chain 100.

When at least one of the validity proof information, the authentication proof information, the detailed proof information, and the use proof information represents that the proof has failed according to the proof test, the manager AI chain 100 may block access of the user 400 to AI information stored in the manager AI chain 100.

In this regard, the proof information 180 may be set to True and represent that the proof has been completed or may be set to False and represent that the proof has failed.

Figure 9:
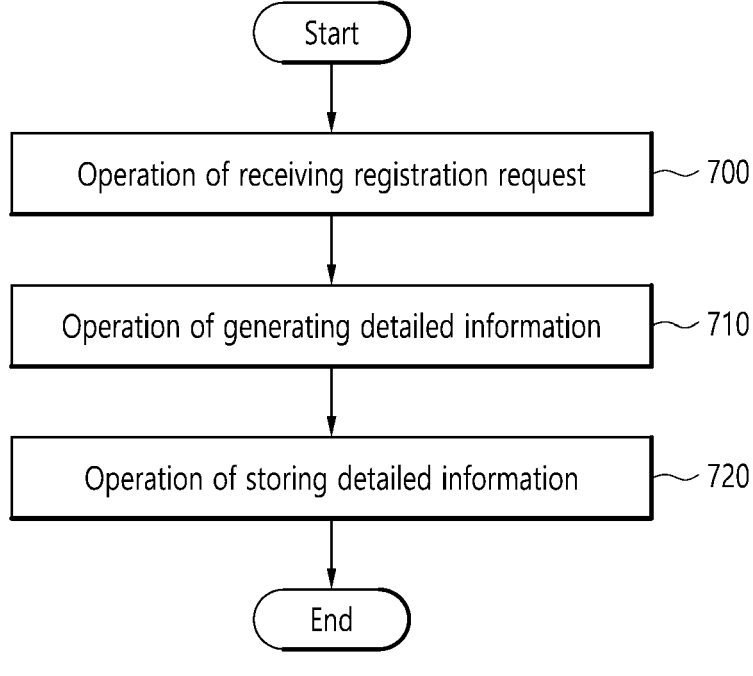
FIG. 9 is a flowchart illustrating an AI management registration method according to an embodiment of the present invention.

FIG. 9 is a flowchart illustrating an AI management registration method according to an embodiment of the present invention.

Since the AI management registration method according to the embodiment of the present invention is performed using substantially the same configuration as the AI management system 1 shown in FIG. 1, the same reference numerals will be given to the same components as the AI management system 1 of FIG. 1, and repetitive descriptions will be omitted.

The AI management registration method may include operation 700 of receiving a registration request, operation 710 of generating detailed information, and operation 720 of storing the detailed information.

In operation 700 of receiving a registration request, the registration request for at least one piece of AI information from the unit AI 110, and the manager AI 120 may be received from an external system.

In this case, the administrator 300 may receive information on at least one piece of AI information from the unit AI 110 and the manager AI 120 from the developer 200.

In operation 710 of generating detailed information, detailed AI information of at least one piece of AI information from the unit AI 110 and the manager AI 120 may be generated.

To this end, the administrator 300 may perform administrator authentication 310 for the received AI information according to a preset test such as a misuse probability test, an operational performance assessment, a mandatory regulation compliance test, etc.

When the AI information received from the developer 200 passes the administrator authentication 310, the administrator 300 may generate detailed AI information from the AI information and register 150 the AI information and the detailed AI information in the manager AI chain 100.

In operation 720 of storing the detailed information, the detailed AI information of at least one piece of AI information from the unit AI 110 and the manager AI 120 may be stored.

Figure 10:
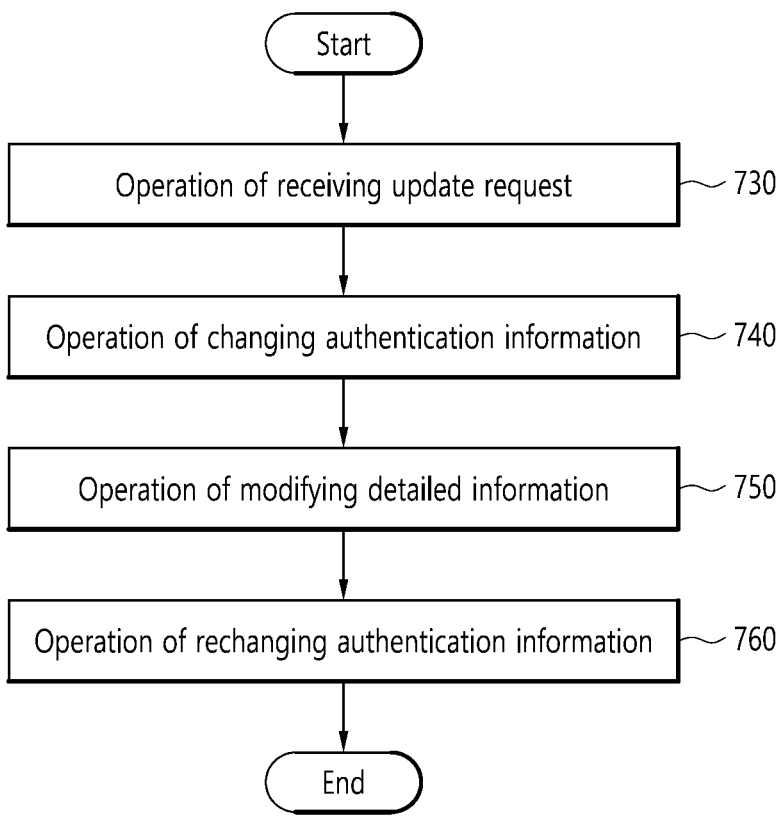
FIG. 10 is a flowchart illustrating a method of updating an AI management in the AI management registration method according to an embodiment of the present invention.

FIG. 10 is a flowchart illustrating a method of updating an AI management in the AI management registration method according to an embodiment of the present invention.

The AI management registration method may additionally include operation 730 of receiving an update request, operation 740 of changing authentication information, operation 750 of modifying detailed information, and operation 760 of rechanging the authentication information.

In operation 730 of receiving an update request, an update request 220 for at least one piece of AI information from the unit AI 110 and the manager AI 120 stored in the manager AI chain 100 may be received from the external system.

In this case, the administrator 300 may receive information on at least one piece of AI information from the unit AI 110 and the manager AI 120 from the developer 200. At this time, the information received by the administrator 300 may include changed information for AI information stored in the manager AI chain 100.

In operation 740 of changing authentication information, authentication information provided in at least one piece of AI information from the unit AI 110 and the manager AI 120 may be changed.

In this regard, the administrator 300 may change pieces of authentication information 111 and 121 of AI information previously stored in the manager AI chain 100 to represent an unauthenticated state.

In operation 750 of modifying detailed information, detailed AI information of at least one piece of AI information from the unit AI 110 and the manager AI 120 may be modified.

To this end, the administrator 300 may perform administrator authentication 310 again for the received AI information according to a preset test such as a misuse probability test, an operational performance assessment, a mandatory regulation compliance test, etc.

When the update for the AI information received from the developer 200 passes the administrator authentication 310, the administrator 300 may modify 160 detailed AI information of the AI information previously stored in the manager AI chain 100.

In operation 760 of rechanging the authentication information, the pieces of authentication information 111 and 121 of at least one piece of AI information from the unit AI 110 and the manager AI 120 modified through operation 750 of modifying detailed information may be rechanged to an authenticated state.

Figure 11:
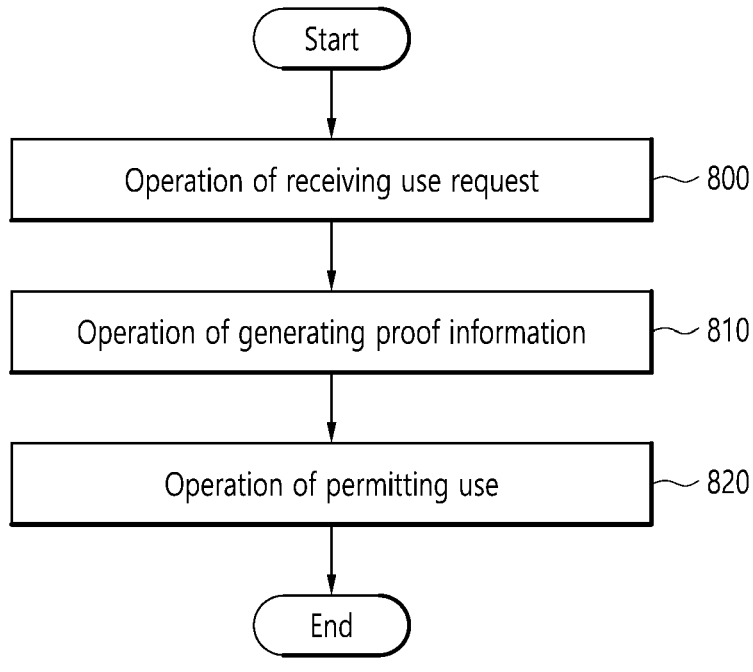
FIG. 11 is a flowchart illustrating an AI management use method according to an embodiment of the present invention.

FIG. 11 is a flowchart illustrating an AI management use method according to an embodiment of the present invention.

Since an AI management use method according to an embodiment of the present invention is performed using substantially the same configuration as the AI management system 1 shown in FIG. 1, the same reference numerals will be given to the same components as the AI management system 1 of FIG. 1, and repetitive descriptions will be omitted.

The AI management use method may include operation 800 of receiving a use request, operation 810 of generating proof information, and operation 820 of the permitted use.

In operation 800 of receiving a user request, a use request 410 for the manager AI 120 may be received from an external system.

The user 400 may transmit the use request 410 for AI information using a blockchain network address of the AI information stored in the manager AI chain 100. In this case, the user 400 may transmit detailed AI information of the AI information installed on the external system thereof and an address of the user 400 of the blockchain network to the manager AI chain 100 so that the manager AI chain 100 can perform a proof test 170.

In operation 810 of generating proof information, the proof test 170 may be performed according to detailed AI information provided in the manager AI 120 to generate proof information 180.

The proof test 170 may be understood as comparing information representing the user 400 with detailed AI information provided in AI information designated by the user 400 to generate the proof information 180, which may include at least one of validity proof information, authentication proof information, detailed proof information, and use proof information.

In operation 820 of the permitted use, the external system may be permitted to use the manager AI 120.

In this regard, when the validity proof information, the authentication proof information, the detailed proof information, and the use proof information are set to a state representing that the validity, the authentication, the detailed information, and the use information have been proved according to the proof test, the manager AI chain 100 may permit the user 400 to access AI information stored in the manager AI chain 100.

Figure 12:
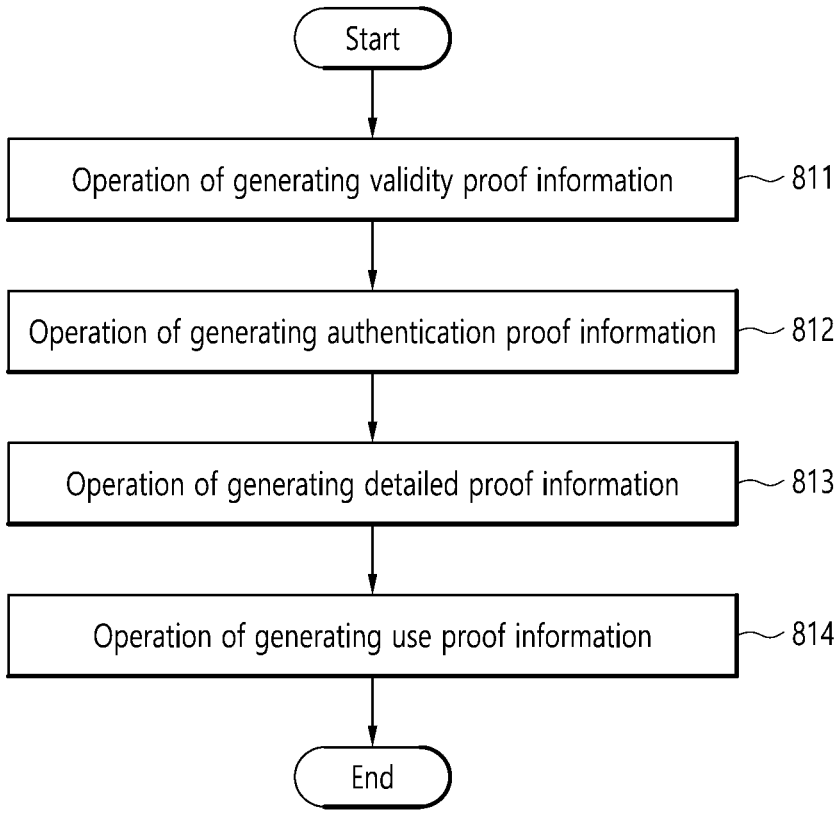
FIG. 12 is a detailed flowchart of an operation of generating proof information in FIG. 11.

FIG. 12 is a detailed flowchart of an operation of generating proof information in FIG. 11.

Operation 810 of proof information may additionally include operation 811 of generating validity proof information, operation 812 of generating authentication proof information, operation 813 of generating detailed proof information, and operation 814 of generating use proof information.

In operation 811 of generating validity proof information, name information 112 of at least one unit AI 110 used in the external system may be compared with validity information 125 provided in the manager AI 120 to generate validity proof information.

In operation 812 of generating authentication proof information, authentication proof information may be generated according to authentication information 121 provided in the manager AI 120.

In operation 813 of generating detailed proof information, detailed information 113 and 124 of AI information used in the external system may be compared with detailed information 124 of the manager AI 120 stored in the manager AI chain 100 to generate detailed proof information.

In operation 814, system name information of the external system may be compared with the use information 129 provided in the manager AI 120 to generate use proof information.

While the present invention has been described with reference to embodiments, it will be understood by those of ordinary skill in the art that various modifications and alterations can be made without departing from the spirit and scope of the present invention as defined by the following claims.

DESCRIPTION OF SIGNS

1: AI management system
100: manager AI chain
200: developer
300: administrator
400: user

The invention claimed is:

1. An An artificial intelligence (AI) management system comprising:

at least one unit AI configured to perform a preset operation;

a manager AI configured to perform a complex operation based on the at least one unit AI; and a manager AI chain having at least one node device controlling an access of an external system to at least one piece of AI information of the at least one unit AI and the manager AI, wherein the manager AI chain is configured to store the at least one piece of AI information of the at least one unit AI and the manager, wherein the manager AI chain stores at least one piece of detailed AI information among authentication information, additional authentication information, name information, detailed information, validity information, development information, test information, fee information, and use information of the manager AI.

2. The AI management system of claim 1, wherein, when the at least one piece of AI information of the at least one unit AI and the manager AI is updated in the external system, the manager AI chain changes authentication information provided in the at least one piece of AI information of the at least one unit AI and the manager AI, which is previously stored, and modifies the at least one piece of AI information of the at least one unit AI and the manager AI.

3. The AI management system of claim 1, wherein, when a request for use of the at least one piece of AI information of the at least one unit AI and the manager AI is received from the external system, the manager AI chain performs a proof test according to detailed AI information provided in the at least one piece of AI information of the at least one unit AI and the manager AI and generates proof information.

4. The AI management system of claim 3, wherein the proof information includes at least one piece of information among validity proof information, authentication proof information, detailed proof information, and use proof information.

5. The AI management system of claim 1, wherein the manager AI chain stores at least one piece of detailed AI information among authentication information, name information, detailed information, development information, test information, fee information, and use information of the at least one unit AI.

6. The AI management system of claim 1, wherein the validity information includes the name information of the at least one unit AI used in the manager AI according to the complex operation performed by the manager AI.

7. A method of registering an artificial intelligence (AI) management, which is a method of registering at least one piece of AI information of at least one unit AI performing an arbitrary operation, a manager AI performing a complex operation based on the at least one unit AI, and a manager AI chain including at least one node device storing the at least one unit AI and the manager AI from an external system, the method comprising:

receiving a request for registration of the at least one piece of AI information of the at least one unit AI and the manager AI from the external system;

generating detailed AI information of the at least one piece of AI information of the at least one unit AI and the manager AI; and storing the detailed AI information of the at least one piece of AI information of the at least one unit AI and the manager AI in the manager AI chain, receiving a request for update of the at least one piece of AI information of the at least one unit AI and the manager AI stored in the manager AI chain from the external system;

changing authentication information provided in the at least one piece of AI information of the at least one unit AI and the manager AI stored in the manager AI chain;

modifying the detailed AI information of the at least one piece of AI information of the at least one unit AI and the manager AI; and rechanging the authentication information about the at least one piece of AI information of the at least one unit AI and the manager AI modified in the modifying of the detailed AI information.

8. A method of using an artificial intelligence (AI) management, which is a method of registering at least one piece of AI information of at least one unit AI performing an arbitrary operation, a manager AI performing a complex operation based on the at least one unit AI, and a manager AI chain including at least one node device storing the at least one unit AI and the manager AI from an external system, the method comprising:

receiving a request for use of the manager AI from the external system;

generating proof information by performing a proof test according to detailed AI information provided in the manager AI; and permitting the external system to use the manager AI according to the proof information, wherein the generating the proof information further comprises:

generating validity proof information by comparing name information of the at least one unit AI used in the external system with validity information provided in the manager AI;

generating authentication proof information according to authentication information provided in the manager AI;

generating detailed proof information by comparing detailed information of AI information used in the external system with detailed information about the manager AI stored in the manager AI chain; and generating use proof information by comparing system name information of the external system with use information provided in the manager AI.

*  *  *  *  *